United States Patent
Huard et al.

(10) Patent No.: US 11,868,689 B2
(45) Date of Patent: Jan. 9, 2024

(54) SYSTEMS AND METHODS FOR SETTING UP A PHYSICS-BASED MODEL

(71) Applicant: KLA Corporation, Milpitas, CA (US)

(72) Inventors: Chad Huard, Austin, TX (US);
Premkumar Panneerchelvam, Austin, TX (US); Guy Parsey, Ann Arbor, MI (US); Ankur Agarwal, Union City, CA (US)

(73) Assignee: KLA Corp., Milpitas, CA (US)

( * ) Notice: Subject to any disclaimer, the term of this patent is extended or adjusted under 35 U.S.C. 154(b) by 0 days.

(21) Appl. No.: 17/959,712

(22) Filed: Oct. 4, 2022

(65) Prior Publication Data
US 2023/0112164 A1    Apr. 13, 2023

Related U.S. Application Data

(60) Provisional application No. 63/254,178, filed on Oct. 11, 2021.

(51) Int. Cl.
*G06F 119/18*   (2020.01)
*G06F 30/27*    (2020.01)

(52) U.S. Cl.
CPC .......... *G06F 30/27* (2020.01); *G06F 2119/18* (2020.01)

(58) Field of Classification Search
CPC .............................. G06F 30/27; G06F 2119/18
See application file for complete search history.

(56) References Cited

U.S. PATENT DOCUMENTS

| 10,346,740 | B2 * | 7/2019 | Zhang | G06V 10/82 |
| 2016/0370797 | A1 | 12/2016 | Azarya et al. | |
| 2018/0308771 | A1 | 10/2018 | Heller | |
| 2018/0314148 | A1 * | 11/2018 | Tetiker | H01J 37/3244 |
| 2019/0206041 | A1 | 7/2019 | Fang et al. | |
| 2020/0176292 | A1 | 6/2020 | Ryu et al. | |
| 2020/0327264 | A1 * | 10/2020 | Wang | H02J 3/008 |
| 2021/0296279 | A1 | 9/2021 | Kato et al. | |
| 2022/0128972 | A1 * | 4/2022 | Pyzer-Knapp | G05B 19/4155 |

FOREIGN PATENT DOCUMENTS

| KR | 10-2020-0068158 | 6/2020 |
| KR | 10-2020-0094218 | 8/2020 |

OTHER PUBLICATIONS

International Search Report and Written Opinion for PCT/US2022/046136 dated Jan. 30, 2023.

* cited by examiner

*Primary Examiner* — Rehana Perveen
*Assistant Examiner* — Cuong V Luu
(74) *Attorney, Agent, or Firm* — Ann Marie Mewherter

(57) ABSTRACT

Systems and methods for setting up a physics-based model are provided. One system includes one or more components that are executed by one or more computer subsystems and that include a physics-based model describing a semiconductor fabrication-related process and a set up component configured for setting up the physics-based model in multiple phases in each of which only a subset of all of the parameters of the physics-based model are set up. A configuration of the set up component is changed between at least two of the multiple phases based on the subset of all of the parameters of the physics-based model set up in the at least two of the multiple phases. The set up component may perform a Bayesian optimization technique for cascaded model set up or calibration using multiple information sources and objective functions.

19 Claims, 5 Drawing Sheets

SYSTEMS AND METHODS FOR SETTING UP A PHYSICS-BASED MODEL

BACKGROUND OF THE INVENTION

1. Field of the Invention

The present invention generally relates to systems and methods for setting up a physics-based model.

2. Description of the Related Art

The following description and examples are not admitted to be prior art by virtue of their inclusion in this section.

Fabricating semiconductor devices such as logic and memory devices typically includes processing a substrate such as a semiconductor wafer using a large number of semiconductor fabrication processes to form various features and multiple levels of the semiconductor devices. For example, lithography is a semiconductor fabrication process that involves transferring a pattern from a reticle to a resist arranged on a semiconductor wafer. Additional examples of semiconductor fabrication processes include, but are not limited to, chemical-mechanical polishing (CMP), etch, deposition, and ion implantation. Multiple semiconductor devices may be fabricated in an arrangement on a single semiconductor wafer and then separated into individual semiconductor devices.

Due to the expense and difficulty of optimizing semiconductor fabrication processes via experiments, many efforts have been made to create physical models of these processes that can replace the experimental work of setting up and optimizing a process. In theory, physical models can evaluate more different values of process parameters faster and cheaper than trying to evaluate the different process parameter values via experiment.

In terms of the models described herein, a "physical model" or "physics-based model" is defined as a forward simulation model based on and describing the physical process it is meant to simulate. These physical models may have alterable parameters that are typically set by fitting modeled data to reference data, but the models themselves do not "learn" how to simulate the physical process. In other words, the physical or physics-based models described herein are not machine learning or deep learning models.

When set up accurately, physical models can be extremely valuable in setting up and optimizing semiconductor fabrication processes. However, the work of setting up a physical model is far from easy and can prevent the implementation of the physical model in the fabrication process set up and optimization. For example, suitable reference data has to be acquired or generated using a well-designed set of experiments, and an appropriate optimization procedure has to be identified and used to set up the physical model.

Currently used model calibration techniques tend to rely on single step optimizations with fixed objective functions. Such techniques must typically be repeated multiple times with incremental improvements before a physical model can be calibrated adequately to accurately reflect reference data.

There are, therefore, a number of disadvantages to the currently used model calibration techniques. For example, single step optimization requires an objective function that accurately and uniquely defines the match between the model and the reference data. It is not always possible to construct such a function. In another example, if multiple optimization runs are required with current methods, the optimization algorithm does not benefit from the results of previous optimizations. In an additional example, two-dimensional (2D) and three-dimensional (3D) simulations require relatively long computational times. With current optimization techniques, all simulation scales included in the objective function must be conducted in lockstep. This requirement makes the optimization technique as slow as the slowest information source.

Accordingly, it would be advantageous to develop systems and methods for setting up a physics-based model that do not have one or more of the disadvantages described above.

SUMMARY OF THE INVENTION

The following description of various embodiments is not to be construed in any way as limiting the subject matter of the appended claims.

One embodiment relates to a system configured to set up a physics-based model. The system includes one or more computer subsystems and one or more components executed by the one or more computer subsystems. The one or more components include a physics-based model describing a semiconductor fabrication-related process and a set up component. The set up component includes an objective function configured for comparing results generated by the physics-based model with different values of one or more parameters of the physics-based model to reference data and for generating output responsive to a difference between the results and the reference data. The set up component also includes a surrogate function configured as an approximation of the objective function and fit to the output generated by the objective function as a function of the different values of the one or more parameters. The set up component further includes an acquisition function configured for selecting additional values of the one or more parameters for the physics-based model based on the surrogate function. The set up component is configured for setting up the physics-based model in multiple phases in each of which only a subset of all of the one or more parameters of the physics-based model are set up. A configuration of the set up component is changed between at least two of the multiple phases based on the subset of all of the one or more parameters of the physics-based model set up in the at least two of the multiple phases. The system may be further configured as described herein.

Another embodiment relates to a computer-implemented method for setting up a physics-based model. The method includes comparing results generated by a physics-based model describing a semiconductor fabrication-related process with different values of one or more parameters of the physics-based model to reference data and generating output responsive to a difference between the results and the reference data with an objective function. The method also includes fitting a surrogate function configured as an approximation of the objective function to the output generated by the objective function as a function of the different values of the one or more parameters. In addition, the method includes selecting additional values of the one or more parameters for the physics-based model based on the surrogate function with an acquisition function. The objective function, the surrogate function, and the acquisition function are included in a set up component. The set up component and the physics-based model are included in one or more components executed by one or more computer systems. The set up component is configured for setting up the physics-based model in multiple phases in each of which only a subset of all of the one or more parameters of the physics-based model are set up. A configuration of the set up component is changed between at least two of the multiple phases based on the subset of all of the one or more parameters of the physics-based model set up in the at least two of the multiple phases.

Each of the steps of the method may be further performed as described further herein. The method may include any other step(s) of any other method(s) described herein. The method may be performed by any of the systems described herein.

Another embodiment relates to a non-transitory computer-readable medium storing program instructions executable on one or more computer systems for performing a computer-implemented method for setting up a physics-based model. The computer-implemented method includes the steps of the method described above. The computer-readable medium may be further configured as described herein. The steps of the computer-implemented method may be performed as described further herein. In addition, the computer-implemented method for which the program instructions are executable may include any other step(s) of any other method(s) described herein.

BRIEF DESCRIPTION OF THE DRAWINGS

Further advantages of the present invention will become apparent to those skilled in the art with the benefit of the following detailed description of the preferred embodiments and upon reference to the accompanying drawings in which.

Figure 1:
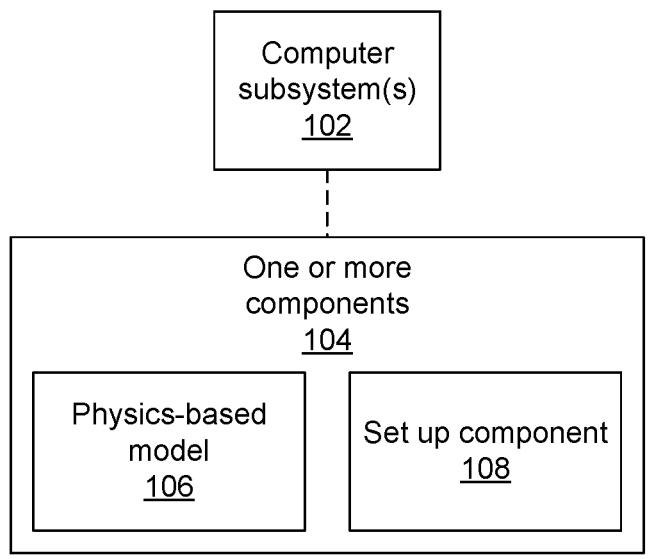
FIG. 1 is a block diagram illustrating one embodiment of a system configured to set up a physics-based model.

While the invention is susceptible to various modifications and alternative forms, specific embodiments thereof are shown by way of example in the drawings and are herein described in detail. The drawings may not be to scale. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Turning now to the drawings, it is noted that the figures are not drawn to scale. In particular, the scale of some of the elements of the figures is greatly exaggerated to emphasize characteristics of the elements. It is also noted that the figures are not drawn to the same scale. Elements shown in more than one figure that may be similarly configured have been indicated using the same reference numerals. Unless otherwise noted herein, any of the elements described and shown may include any suitable commercially available elements.

In general, the embodiments described herein are configured for setting up a physics-based model. Some embodiments described herein are configured for cascaded model calibration using multiple information sources and objective functions. The embodiments may be used for calibration of first-principles computational models of processes such as etching and lithography in the semiconductor processing industry to accurately reflect reference data.

"Setting up a physics-based model" as that term is used herein is defined as selecting one or more parameters of a physics-based model regardless of the reason why the parameter selection process is performed. For example, setting up a physics-based model may include setting up a new physics-based model that has not yet been released for use. Therefore, the embodiments described herein may be used for generating or performing an initial set up of a new physics-based model, which can be a new model for an old process or a new model for a new process. Setting up a physics-based model may also include modifying a previously set up physics-based model as may be done for calibration or optimization purposes. Such calibration or optimization may be performed for a number of reasons including, but not limited to, intentional or unintentional changes in the process that the physics-based model describes. Intentional changes may include, for example, when a process is changed in order to change the devices being manufactured, e.g., when replacing one material with another or when a change in a critical dimension of a feature becomes advantageous. Unintentional changes may include, in one example, when there is unexpected drift in how the process performs, which makes an update to the physics-based model describing such process advantageous.

Constraints on etching and lithography processes during microelectronics fabrication are constantly increasing due to scaling requirements. As feature sizes decrease, the ability for traditional design of experiment (DOE) based process optimization becomes inadequate. Physics-based, first-principles modeling provides process engineers with the ability to meet the increasing demands more efficiently than current techniques. To be effective, first-principles models must be calibrated to match reference data of the process being modeled. This calibration process can be a significant obstacle to the use of physics-based models in this field due to the complexity of the models and lack of direct measurement techniques for internal model parameters. Novel optimization techniques are required to achieve successful utilization of such physics-based models in the microelectronics fabrication industry.

The embodiments described herein provide methods to utilize Bayesian optimization (BO) techniques to perform an optimization that includes several (i.e., two or more) cascaded optimization phases. In one embodiment, each of the multiple phases is performed based on output generated by any previously performed of the multiple phases. For example, as described further herein, this cascaded optimization technique may make use of prior knowledge at each optimization phase from all previous phases. The cascaded optimization technique also allows for the use of different objective functions during each optimization phase. In a further embodiment, the input to the set up component includes multiple information sources. For example, as described further herein, the cascaded optimization technique allows for the use of multiple information sources in such a way that enables the use of substantially rapid simulations to reduce the number of relatively long simulations that are in each optimization step.

One embodiment relates to a system configured to set up a physics-based model. One embodiment of such a system is shown in FIG. 1. The system includes one or more computer subsystems 102 and one or more components 104 executed by the one or more computer subsystems. The one or more components may be configured as described further herein and may be executed by the one or more computer subsystems in any suitable manner known in the art.

The computer subsystem(s) may also be referred to herein as computer system(s). Each of the computer subsystem(s) or system(s) described herein may take various forms, including a personal computer system, image computer, mainframe computer system, workstation, network appliance, Internet appliance, or other device. In general, the term "computer system" may be broadly defined to encompass any device having one or more processors, which executes instructions from a memory medium. The computer subsystem(s) or system(s) may also include any suitable processor known in the art such as a parallel processor. In addition, the computer subsystem(s) or system(s) may include a computer platform with high speed processing and software, either as a standalone or a networked tool.

If the system includes more than one computer subsystem, then the different computer subsystems may be coupled to each other such that images, data, information, instructions, etc. can be sent between the computer subsystems. For example, one computer subsystem may be coupled to another computer subsystem by any suitable transmission media, which may include any suitable wired and/or wireless transmission media known in the art. Two or more of such computer subsystems may also be effectively coupled by a shared computer-readable storage medium (not shown).

The one or more components executed by the one or more computer subsystems include physics-based model 106 describing a semiconductor fabrication-related process. In one embodiment, the semiconductor fabrication-related process is a lithography process. In another embodiment, the semiconductor fabrication-related process is an etch process. The lithography process and the etch process may include any lithography and etch processes, respectively, known in the art. In addition, the semiconductor fabrication-related process may include any other semiconductor fabrication process known in the art including chemical-mechanical polishing (CMP), deposition, ion implantation, and the like.

A "semiconductor fabrication-related process" as described herein is not limited, however, to processes such as those described above that cause a change to the physical specimen on which the process is performed. For example, the term "semiconductor fabrication-related process" is defined herein as any process related to the fabrication of semiconductor devices on a specimen. Such a process that does not directly cause a change to a physical specimen for which the process is performed is a semiconductor device design process. This process can be described by a physics-based model because it is a process that is rooted in the physics of the semiconductor design and how the design affects the physics of the semiconductor devices it is used to fabricate.

Another such process that typically does not directly, in of itself, cause a change to a physical specimen on which the process is performed is a quality control type process performed before, during, and/or after a semiconductor fabrication process. Such processes include inspection processes, metrology processes, and defect review processes that are also rooted in the physics of the tools used for such processes and the physics of how such tools interact with and generate information for the specimen being examined. For example, a physics-based model for such a process may simulate how different parameters of the quality control tool affect images, measurements, etc. generated by the tool for a specimen.

In addition to the semiconductor fabrication-related processes described above, other processes that are more related to quality control but can affect the physical specimen itself can also be described by a physics-based model. For example, a repair process may not always be used in a semiconductor fabrication process, but when a change to a specimen is needed such a process may be used to correct or refine one or more physical or chemical aspects of the specimen due to some failure or marginality in a fabrication process step. Such processes also include cleaning type processes that may be used to globally or locally remove unwanted material from a specimen thereby causing changes to the specimen itself.

As can be seen from the above description then, the "semiconductor fabrication-related process" may or may not, in of itself, change a physical specimen, which may be the specimen on which the semiconductor devices are being formed or another specimen involved in such formation of devices. For example, in some embodiments, the specimen is a wafer. The wafer may include any wafer known in the semiconductor arts. In addition, the embodiments described herein may be used for specimens such as reticles, flat panels, personal computer (PC) boards, and other semiconductor specimens. In this manner, a "semiconductor fabrication-related process" as that term is used herein can also be defined as any process involved or related to the fabrication of semiconductor devices on a specimen that can be described based on the physics involved in the process.

Figure 2:
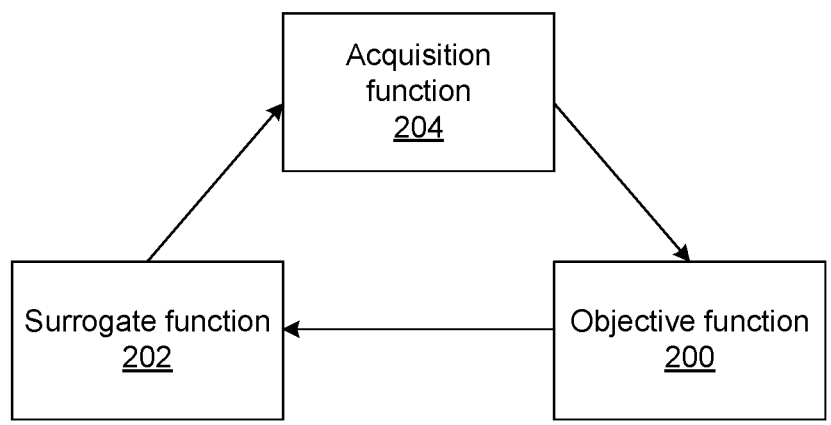
FIGS. 2-4 are block diagrams illustrating embodiments of a set up component configured for setting up a physics-based model.

The one or more components also include set up component 108 that includes an objective function configured for comparing results generated by the physics-based model with different values of one or more parameters of the physics-based model to reference data and for generating output responsive to a difference between the results and reference data. For example, as shown in FIG. 2, the set up component may include objective function 200. In general, the objective function uses the physical model to predict the results of a microelectronics fabrication step and compare those results to results obtained by experiment(s). The difference, or error, between these results is inversely related to the output of the objective function. This objective function is expected to be maximized during optimization, but it is often time consuming to evaluate. The objective function may have any suitable form or format known in the art.

The reference data that is used in the embodiments described herein may or may not be generated by the embodiments described herein. For example, the embodiments described herein may include a semiconductor fabrication-related tool (not shown) configured to perform one or more of the semiconductor fabrication-related processes described herein. The embodiments may use that tool to generate the reference data by performing a suitably designed set of experiments on one or more specimens. For example, a process may be performed on one or more specimens with different values for one or more parameters of the process followed by examination of the specimen(s) on which the process(es) was or were performed that results in some information about the characteristics of the physical specimen(s). Such experiments may be performed in a variety of different ways such as focus-expose matrix (FEM) and process window qualification (PWQ) processes, which may be performed in any suitable manner known in the art.

In other instances, the embodiments described herein may not generate the reference data but may simply acquire it from another system or method (not shown) that generated the reference data or from a storage medium, such as one of those described further herein, in which the reference data has been stored by another system or method. The embodiments described herein may acquire such reference data in any suitable manner known in the art.

The set up component also includes a surrogate function configured as an approximation of the objective function and fit to the output generated by the objective function as a function of the different values of the one or more parameters. As shown in FIG. 2, the set up component may include surrogate function 202. The surrogate function is a function that can predict the result of evaluating the objective function but is much quicker to evaluate. The surrogate function is incrementally fit to data generated by the objective function during the optimization, resulting in better predictions with more provided objective function data. The surrogate function may have any suitable form or format known in the art.

The set up component further includes an acquisition function configured for selecting additional values of the one or more parameters for the physics-based model based on the surrogate function. As shown in FIG. 2, the set up component may include acquisition function 204. In another embodiment, the additional values selected by the acquisition function in one of the multiple phases are used by the objective function as values of the one or more parameters of the physics-based model in a subsequent one of the multiple phases. For example, the acquisition function uses the surrogate function to determine a best guess for the most useful point in parameter space to evaluate the objective function next. In this way, the BO technique can use many (or at least one or more) calls to the surrogate function to minimize the number of calls to the more complex objective function. The acquisition function may have any suitable form or format known in the art. The additional values selected by the acquisition function may be used in the next step or phase of the set up process or as the final values for the physics-based model depending on which step or phase of the set up process the set up component is performing.

The set up component is configured for setting up the physics-based model in multiple phases in each of which only a subset of all of the one or more parameters of the physics-based model are set up. For example, in phase 1, parameter subset 1 may be set up, in phase 2, parameter subset 2 is set up, and so on. While there may be some overlap between one or more of these parameter subsets (e.g., parameter 1 may be in more than one parameter subset), none of the parameter subsets would be exactly the same ideally. "Setting up" the one or more parameters may or may not result in modifications to the original settings of the one or more parameters. For example, the set up component may determine that the original setting for one of the parameters is the best setting for that parameter. In general, however, the set up component may "set up" the one or more parameters by modifying the parameters in a subset until settings for those parameters are found that result in essentially fitting at least a portion of the model data to the reference data via the BO techniques described herein. Parameters that are "set up" in one phase may be altered in a later phase if they are included in a subset that is set up in a later phase. In such instances, the earlier phase could be considered a coarse setting up phase, and the later phase could be considered a kind of fine setting up phase or a fine tuning of the earlier set up parameter(s).

To illustrate this concept further, consider a physical model with N internal parameters developed to represent a microelectronics fabrication process. Experiments may be conducted to generate a set of reference data to use for calibration. The objective function is constructed to represent the difference between the model prediction and the reference data. The optimization process is divided into cascading phases. In some embodiments, the objective function is constant in each of the multiple phases. For example, during each phase, only a subset of the internal parameters of the physical model are modified as part of the optimization whereas the objective function may be held a constant. In an additional embodiment, setting up only the subset of all of the one or more parameters of the physics-based model in each of the multiple phases includes inputting the selected additional values into the objective function until optimal values for the subset of all of the one or more parameters of the physics-based model are found that maximize the objective function. For example, the optimization phase may continue until the optimal values for the current subset of internal parameters has been found that maximizes the objective function (difference between reference data and model data). In a further embodiment, the surrogate function fit in one of the multiple phases is utilized in a subsequent one of the multiple phases. In this manner, after each phase, the fit surrogate function may be directly utilized by the next phase. Using the surrogate function from one phase in the next phase results in each phase benefitting from the prior knowledge gained by the previous phase(s).

In one embodiment, the set up component is configured for performing a BO technique in which the multiple phases are cascaded optimization phases. The BO technique is composed of three components: an objective function, a surrogate function, and an acquisition function. These functions may be configured as described further herein. In addition, the BO technique may be composed of more than one of each (or one or more) of these three components.

A configuration of the set up component is changed between at least two of the multiple phases based on the subset of all of the one or more parameters of the physics-based model set up in the at least two of the multiple phases. For example, the set up component and its constituent components are preferably configured in each phase in such a way as to make it possible to specify each component to be best suited for the subset of parameters being addressed in that phase. The configuration of the set up component may be changed in a variety of different ways. For example, a user, the one or more computer subsystems, the set up component itself, or another method or system may change the configuration of the set up component between two (or more) of the multiple phases. Changing the configuration of the set up component between two phases may include changing any one or more parameters of the set up component or one or more of its constituents, changing any one or more of the functions themselves (e.g., by swapping out one function with a different one), changing, modifying, or replacing the input to the set up component, and/or changing any other aspect of the set up component that affects how the parameter(s) of the physics-based model are set up. In this manner, between two set up phases, some aspect(s) of the set up component including any of its constituent components may be changed, and other aspects of the set up component may remain the same. The changing of the configuration of the set up component between one or more of the multiple set up phases is an important new feature of the embodiments described herein because, as described further herein, this ability allows for retaining and utilizing prior knowledge gained by the previous phase(s) when that is advantageous as well as adapting the set up component to the parameter(s) that are being set up. Changing the configuration of the set up component may be further performed as described herein.

In an additional embodiment, the objective function used in at least one of the multiple phases is replaced with a different objective function in at least another of the multiple phases. For example, the cascaded optimization phases described above may be performed as described above but utilizing different objective functions for each (or one or more) of the phases. In this case, the objective function for each phase may be constructed in such a way as to have a relatively strong response to the subset of internal model parameters being optimized during that phase.

Figure 3:
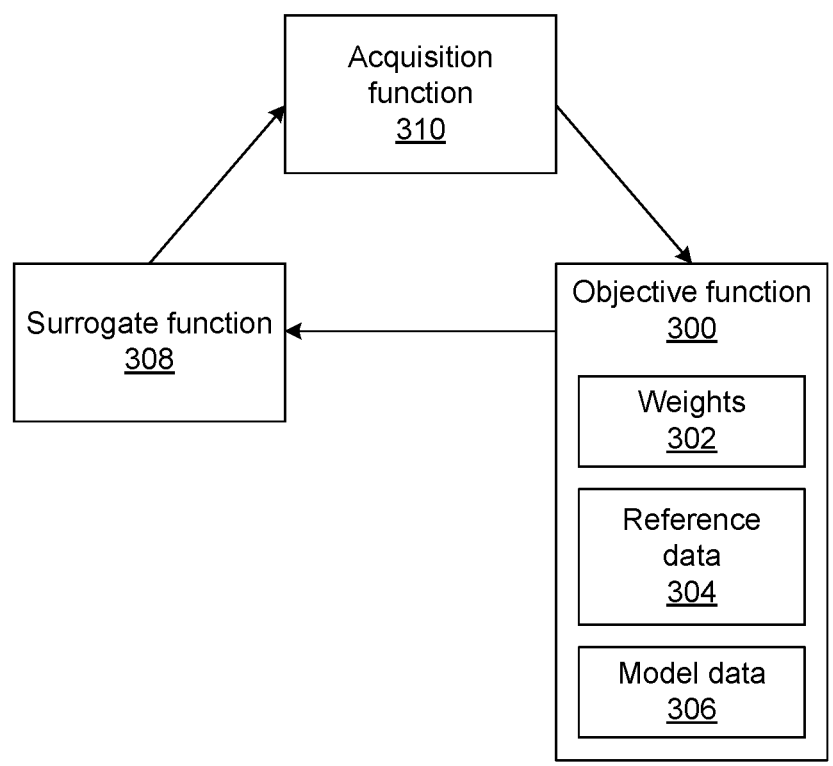

In another embodiment, the results generated by the physics-based model in one of the multiple phases is input to the objective function in a subsequent one of the multiple phases, and at least one weight for the reference data in the one of the multiple phases and the subsequent one of the multiple phases are different. FIG. 3 shows one embodiment of BO with a generalized objective function. As shown in FIG. 3, to enable the use of prior simulation results in this embodiment, objective function 300 is split into several components: reference data 304 being fit, model data 306 being generated, and a set of weights 302 for each piece of reference data. Surrogate function 308 and acquisition function 310 may be configured as described further herein. In this embodiment, instead of keeping the surrogate function from the previous optimization phase, all generated model data may be kept from each phase. At the beginning of each optimization phase, all previously generated model data is compared to the reference data using different weights than previous phases. This retention and use of previously generated model data allows the objective function to change for each optimization phase to thereby tailor the objective function to the subset of parameters being optimized in that phase, while still allowing for the use of previous simulation results to inform the surrogate function.

In one embodiment, the acquisition function used in at least one of the multiple phases is replaced with a different acquisition function in at least another of the multiple phases. For example, the embodiments may use cascaded optimization phases to enable utilizing different acquisition functions for each (or one or more) of the optimization phases. The acquisition function that is used has a relatively strong effect on the outcome of the optimization by balancing the tendency of the optimization to explore parameter space versus converging to a local minimum. Allowing for different acquisition functions enables tuning each phase for the specific requirements of that optimization stage.

In some embodiments, the reference data used in at least one of the multiple phases is replaced with different reference data in a subsequent one of the multiple phases. For example, the embodiments may use the cascaded optimization phases described herein but include multiple information sources in the objective function of one or more phases. In one such embodiment, the reference data and the different reference data result in different computational complexity for the physics-based model. In this context, different information sources are typically different sources of reference data that result in different computational complexity for the model. For instance, one-dimensional (1D), two-dimensional (2D), and three-dimensional (3D) reference data can require substantially different computation times for the model and may therefore be treated as different information sources. In another such embodiment, the reference data is a more computationally efficient source for the physics-based model than the different reference data. When multiple information sources are present, the most computationally efficient source is preferably run first.

In some embodiments, the surrogate function is configured to provide an upper bound on predicted objective function value for a location of the different values of the one or more parameters in parameter space. The results of the more rapid information source can be used to fit the surrogate function in such a way that it provides an upper bound on the predicted objective function value for that location in parameter space. In this case, the objective function should be constructed so that each information source contributes a positive definite fraction of the total objective value. Therefore, if one of the information sources results in a relatively low objective value, there is no purpose to evaluate the more computationally demanding information source(s) at that location. In other words, when there is a relatively "low" objective value, that means that the error is relatively high for the combination of that information source and the parameter(s) that are being tested. Therefore, it makes little sense to evaluate the more computationally demanding information source(s) at that location because you know that those parameter values are probably (or definitely) not "good" and so it is better to move to a different area of the parameter space to get the next parameters to evaluate. The next parameters selected for evaluation may be evaluated with the same information source or the next information source. In other words, if the more rapid model is evaluated and it is found that the parameters being investigated are "bad" (they have a relatively low objective value), then it can be determined that if the slower model is evaluated, the results would still be bad. So there is no reason to run the slower model.

Another embodiment uses multiple information sources in a different way than previously described. In this embodiment, different sources of reference data at different scales of computational complexity are used in a nested optimization pattern. In another embodiment, the objective function and the surrogate function used in the at least one of the multiple phases are replaced with a different objective function and a different surrogate function, respectively, in the subsequent one of the multiple phases. For example, each information source described above may use its own independent objective and surrogate functions. In this embodiment, the faster to compute sources of information are nested inside of the slower information sources.

In a further embodiment, the acquisition function used in one or more of the at least one of the multiple phases is replaced with a different acquisition function in the subsequent one of the multiple phases, and the different acquisition function samples the surrogate function and the different surrogate function for selecting the additional values. For example, there may be a different acquisition function for each information source (or two or more information sources), but the acquisition functions are not totally independent for each information source. The ith acquisition function samples the surrogate function(s) from all (or at least one or more) information sources<=i to determine the next sample point for the ith objective function. The acquisition function balances the information sources such that points from faster information sources that are known to have relatively low objective values are less likely to be probed by slower information sources. This decision making is similar to that described above in which parameters that have relatively low objective values are abandoned in hopes of finding better parameters in another location in parameter space. This situation is different, however, in where you incorporate the information from the rapid model, i.e., in the objective function in the above-described embodiment or the acquisition function in this embodiment. In both cases, the result is similar, that the slower model is not run for parameters that are already known to be "bad."

Figure 4:
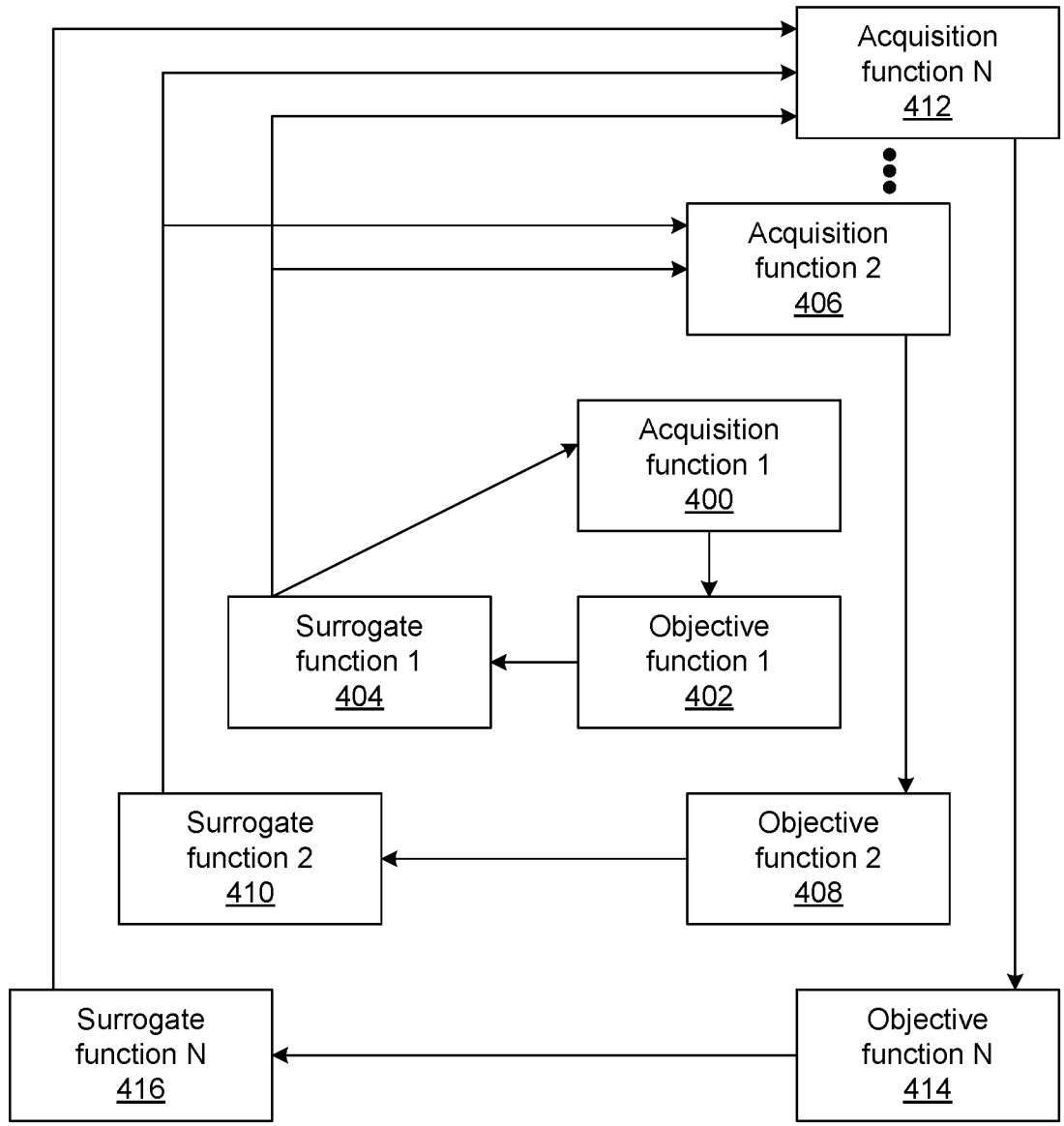

FIG. 4 shows one embodiment of a multi-scale nested BO. The first phase of the cascaded BO technique uses acquisition function 1 (400), objective function 1 (402), and surrogate function 1 (404), which may be configured according to any of the embodiments described herein and perform BO using a first information source (not shown in FIG. 4).

The second phase of the cascaded BO technique uses acquisition function 2 (406), objective function 2 (408), surrogate function 2 (410), and possibly surrogate function 1 (404), which may be configured according to any of the embodiments described herein and perform BO using a second information source (not shown in FIG. 4) that is different from the first information source. For example, the second information source may have more computational complexity for the physics-based model than the first information source. In other words, the second information source may be more computationally demanding and slower to compute than the first information source. Unlike the first phase, in the second phase, the inputs to acquisition function 2 may include output of surrogate functions 1 and 2.

The final, and possibly third, phase of the cascaded BO technique uses acquisition function N (412), objective function N (414), surrogate function N (416), and optionally surrogate function 1 (404) and/or surrogate function 2 (410), which may be configured according to any of the embodiments described herein and perform BO using a third information source (not shown in FIG. 4) that is different from the first and second information sources. For example, the third information source may have more computational complexity for the physics-based model than the first and second information sources. In other words, the third information source may be more computationally demanding and slower to compute than the first and second information sources. Unlike the first and second phases, in the final, and possibly third, phase, the inputs to acquisition function N may include output of surrogate functions 1, 2, . . . N. In this manner, in all of the phases except for the first phase, the acquisition function may sample the surrogate function from all information sources (i.e., all prior phases). Therefore, although each of acquisition functions 1, 2, . . . N may be different for each different information source, the acquisition functions are not totally independent for each information source.

The embodiments described herein can be combined in any suitable manner. Any or all optimization phases can include different objective functions and/or multiple information sources. In some embodiments, the objective function is configured as a machine learning (ML) model. In another embodiment, the surrogate function is configured as a ML model. For example, the objective function can be replaced with a ML model either at the beginning or during the course of the optimization procedure(s) described above in any of the embodiments. Similarly, the surrogate function can also be replaced by a ML model. An objective function and a surrogate function described herein can have any suitable ML configuration and architecture known in the art.

The embodiments described herein have a number of important advantages over other currently used methods and systems for setting up a physics-based model. For example, the embodiments described herein enable multiple information source optimization, which makes computation more efficient and faster. In addition, the cascaded optimization with history described herein requires fewer total simulation runs to achieve a similar overall optimization result. Furthermore, utilizing different objective functions for different optimization phases results in a better optimization of parameters that may have relatively low sensitivity in an overall objective function.

The challenges of developing processes that enable the continuous shrinking of critical dimension (CD) of features in microelectronics fabrication are increasing. These challenges are also increasing not only the time to develop an optimized process that is manufacturable on a relatively large scale, but also research and development costs associated with it. The embodiments described herein leverage the power of physical modeling to accelerate the time-to-solutions at capturing the higher level of details that can help users to shrink the development time and reduce research and development costs. For these techniques to be effective, accurate calibration of the underlying physical model to customer reference data is essential. In addition, the embodiments described herein enable calibrating more sophisticated and complex computational models than was previously possible.

The advantages described above and other advantages described herein are provided by a number of important, new features of the embodiments described herein. One such feature includes the ability of using prior results in a multi-phase optimization. In addition, the embodiments described herein may be configured for re-evaluating the objective function for each phase of optimization to allow for use of prior results to inform a new surrogate function. Furthermore, the embodiments described herein can be configured for utilizing multiple information sources to reduce computational resources used to evaluate the objective function at each point in parameter space.

The following examples are described herein to promote and further the understanding of some of the embodiments described herein. These examples are not intended to limit the spirit and scope of the invention as described in the claims following this section by virtue of their inclusion in this section.

Figure 5:
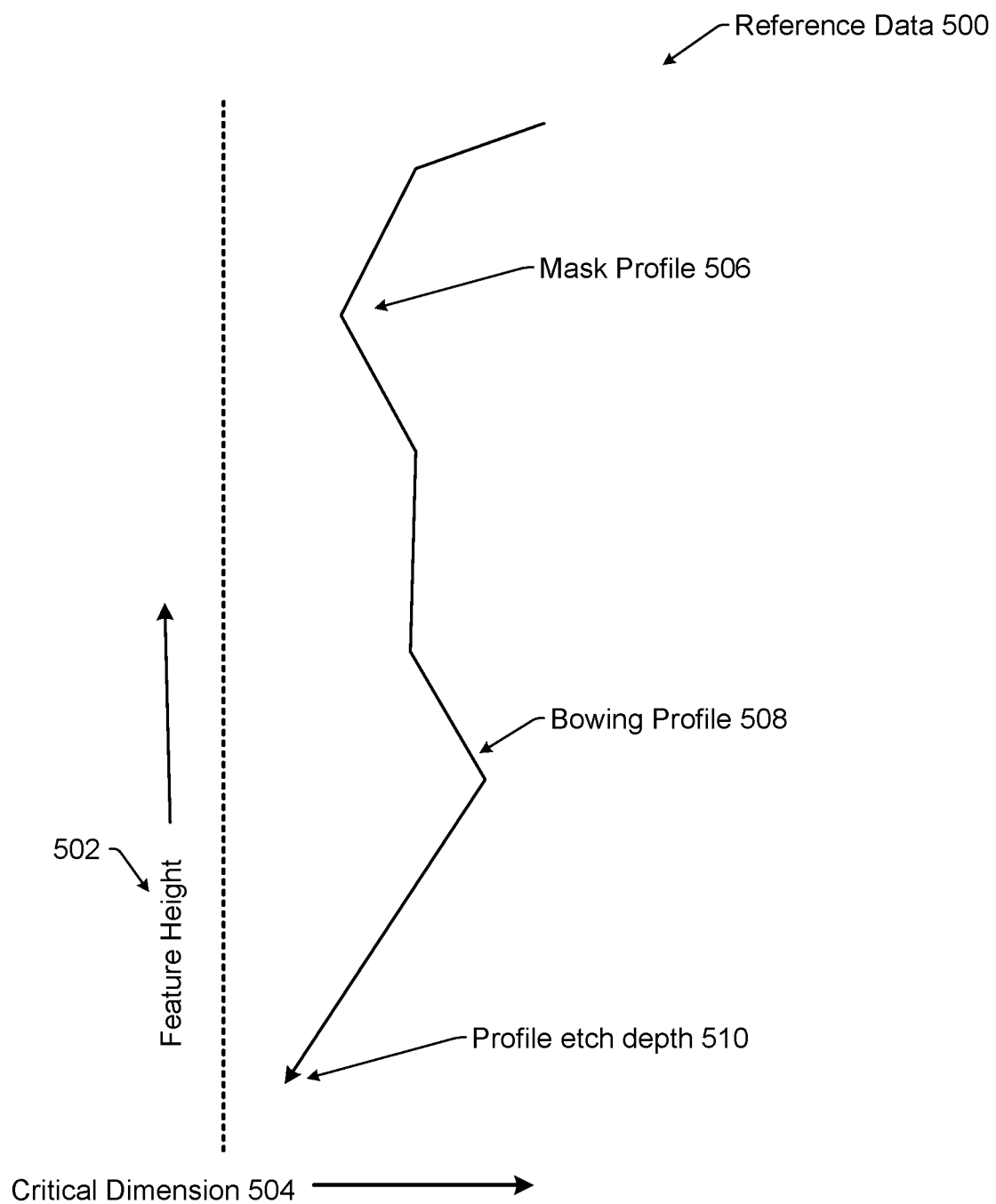
FIG. 5 is a schematic diagram illustrating one example of target reference data that may be used by the embodiments described herein for setting up a physics-based model.

Several steps that may be performed in an example proposed workflow are now described. In step 1, the embodiments described herein or another method or system may generate a physical model of an etching process to match a set of reference data for the etching of a target material using a mask of a different material in a plasma etching environment. For this example, the reference data includes two information sources: blanket etch rates of the two materials involved (1D data) and sidewall etch profiles of cylindrical etch features (3D data). Within the sidewall etch profiles, there are three main features that are of interest for process optimization: mask profile, feature etch depth, and target material "bowing" (widening of the etch feature at some etch depth). These features are shown schematically in FIG. 5 as a function of feature height 502 and critical dimension 504. In this example, reference data 500 includes mask profile 506, bowing profile 508, and profile etch depth 510.

Figure 6:
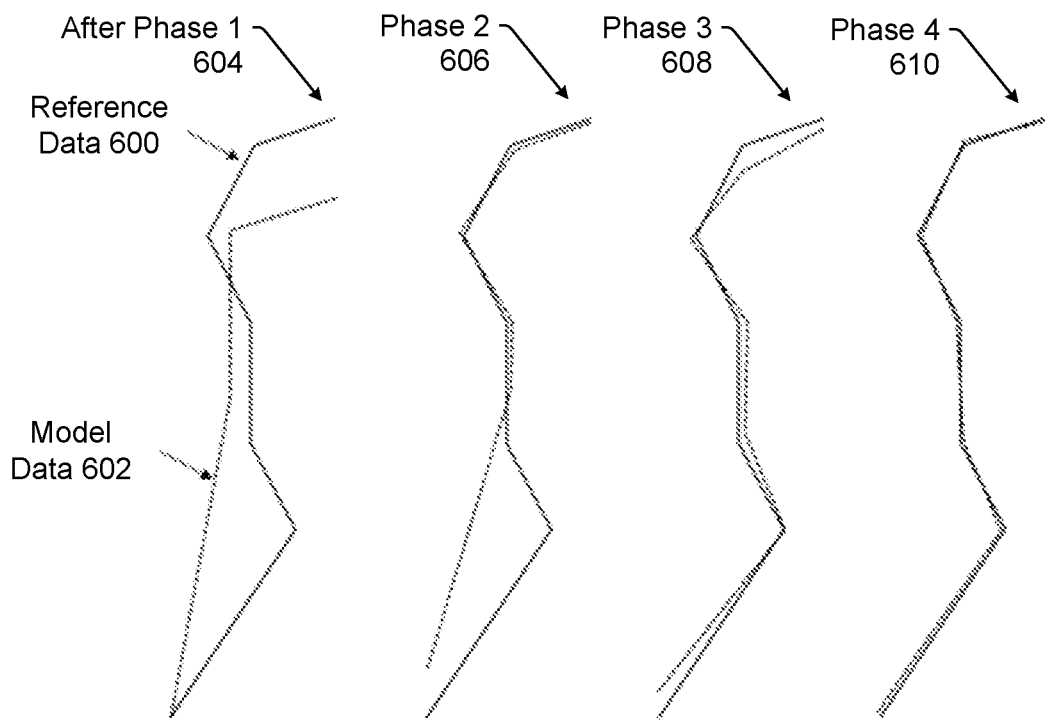
FIG. 6 is a schematic diagram illustrating one example of a cascaded optimization workflow.

In step 2, the computer subsystem(s), the component(s), and/or the set up component may divide the optimization process up into phases. In this case, the optimization is divided into four phases shown in FIG. 6. The first phase targets obtaining the correct feature etch depth by tuning only the internal model parameters that are expected to be strongly expressive in this objective, and the objective function only includes non-zero weights for reference data that represents this feature of the process. For example, as shown in FIG. 6, after phase 1 (604), model data 602 (shown by the dotted line in all of the phases illustrated in FIG. 6) and reference data 600 (shown by the solid line in all of the phases illustrated in FIG. 6) converge at the bottom of the feature height shown in FIG. 5 by the profile etch depth 510. As shown in FIG. 6, after phase 1, other than near the profile etch depth, significant differences between the reference data and the model data are apparent in all other portions of the reference data.

The second phase targets optimization of the mask profile, with the internal parameters and objective function terms chosen to focus on this goal. As shown in FIG. 6, after phase 2 (606), the model data and the reference data converge in the mask profile 506 section of the reference data shown in FIG. 5. As shown in FIG. 6, after phase 2, the model and reference data differ somewhat near the profile etch depth (more than they did after phase 1), which can be remedied in following phases. The third phase similarly targets the feature bowing. As shown in FIG. 6, after phase 3 (608), the model data and the reference data converge quite well in bowing profile 508 section of the reference data shown in FIG. 5. A fourth and final phase includes all the possible internal model parameters and objective terms. As shown in FIG. 6, after phase 4 (610), the model data substantially approximates the reference data at all data points in the reference data. Since the surrogate function at the beginning of this phase is already fit with all the data from previous phases, the optimization is much more successful than a single step optimization using the same objective function.

In step 3, the computer subsystem(s), the component(s), and/or the set up component may divide the objective function into separate information sources. In this case, the 1D (blanket etch rate) and 3D (etch profile) data are treated as separate information sources. The 1D information source may be used in each of the four optimization phases to speed the evaluation of the objective function. For each call to the objective function in the optimization loop, the blanket etch rate may be simulated first. This calculation is substantially fast (on the order of several seconds). If the blanket etch rate is close enough to the reference value to produce a substantially high objective value, the 3D simulation will then be run. The complete value of the objective function is then used to fit the surrogate function at this point in parameter space. If the blanket etch rate is not relatively close to the reference data, resulting in a substantially low objective value, this value is used to provide an upper bound to the surrogate function at this location of parameter space. The acquisition function is then called with the new surrogate function to find the next sampling point without running the 3D data at the previous point.

In some embodiments, the computer subsystem(s) are configured for storing information for the set up physics-based model. The computer subsystem(s) may be configured to store the information in a recipe or by generating a recipe for the process in which the set up physics-based model will be used. A "recipe" as that term is used herein can be generally defined as a set of instructions that can be used by a tool to perform a process that includes a simulation performed by the set up physics-based model. In this manner, generating a recipe may include generating information for how a process is to be performed, which can then be used to generate the instructions for performing that process. The information for the set up physics-based model that is stored by the computer subsystem(s) may include any information that can be used to identify and/or use the set up physics-based model (e.g., such as a file name and where it is stored, and the file may include information for the set up physics-based model such as model parameter values, etc.).

The computer subsystem(s) may be configured for storing the information for the set up physics-based model in any suitable computer-readable storage medium. The information may be stored with any of the results and/or data described herein and may be stored in any manner known in the art. The storage medium may include any storage medium described herein or any other suitable storage medium known in the art. After the information has been stored, the information can be accessed in the storage medium and used by any of the method or system embodiments described herein, formatted for display to a user, used by another software module, method, or system, etc. For example, the embodiments described herein may generate a recipe as described above. That recipe may then be stored and used by the system or method (or another system or method) to perform a process that includes a simulation performed by the set up physics-based model.

Results and information generated by the set up physics-based model may be used in a variety of manners by the embodiments described herein and/or other systems and methods. Such functions include, but are not limited to, altering a process such as a fabrication process or step that was or will be performed on a specimen in a feedback or feedforward manner. The changes to the process may include any suitable changes to one or more parameters of the process. The computer subsystem(s) described herein may determine such changes in any suitable manner known in the art.

Those changes can then be sent to a semiconductor fabrication system (not shown) or a storage medium (not shown) accessible to the computer subsystem(s) and the semiconductor fabrication system. The semiconductor fabrication system may or may not be part of the system embodiments described herein. For example, the computer subsystem(s) described herein may be coupled to the semiconductor fabrication system, e.g., via one or more common elements such as a housing, a power supply, etc. The semiconductor fabrication system may include any semiconductor fabrication system known in the art such as a lithography tool, an etch tool, a chemical-mechanical polishing (CMP) tool, a deposition tool, and the like. The semiconductor fabrication-related system may also be a system for a different process described herein such as an electronic design automation (EDA) tool, an inspection tool, a metrology tool, a defect review tool, a device repair tool, etc. Such tools and systems may include any such tools and systems known in the art.

Each of the embodiments of each of the systems described above may be combined together into one single embodiment.

Another embodiment relates to a computer-implemented method for setting up a physics-based model. The method includes comparing results generated by a physics-based model describing a semiconductor fabrication-related process with different values of one or more parameters of the physics-based model to reference data and generating output responsive to a difference between the results and the reference data with an objective function. The method also includes fitting a surrogate function configured as an approximation of the objective function to the output generated by the objective function as a function of the different values of the one or more parameters. In addition, the method includes selecting additional values of the one or more parameters for the physics-based model based on the surrogate function with an acquisition function. The objective function, the surrogate function, and the acquisition function are included in a set up component. The set up component and the physics-based model are included in one or more components executed by one or more computer systems. The set up component is configured for setting up the physics-based model in multiple phases in each of which only a subset of all of the one or more parameters of the physics-based model are set up.

Each of the steps of the method may be performed as described further herein. The method may also include any other step(s) that can be performed by the system, computer system(s), and/or component(s), described herein. The computer system(s) may be configured according to any of the embodiments described herein, e.g., computer subsystem(s) 102. The one or more components may also be configured according to any of the embodiments described herein. The method may be performed by any of the system embodiments described herein.

Figure 7:
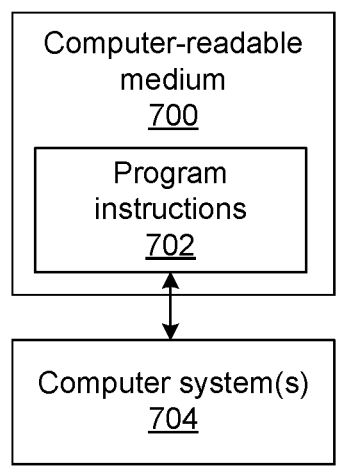
FIG. 7 is a block diagram illustrating one embodiment of a non-transitory computer-readable medium storing program instructions for causing computer system(s) to perform a computer-implemented method described herein.

An additional embodiment relates to a non-transitory computer-readable medium storing program instructions executable on one or more computer systems for performing a computer-implemented method for setting up a physics-based model. One such embodiment is shown in FIG. 7. In particular, as shown in FIG. 7, non-transitory computer-readable medium 700 includes program instructions 702 executable on computer system(s) 704. The computer-implemented method may include step(s) of any method(s) described herein.

Program instructions 702 implementing methods such as those described herein may be stored on computer-readable medium 700. The computer-readable medium may be a storage medium such as a magnetic or optical disk, a magnetic tape, or any other suitable non-transitory computer-readable medium known in the art.

The program instructions may be implemented in any of various ways, including procedure-based techniques, component-based techniques, and/or object-oriented techniques, among others. For example, the program instructions may be implemented using ActiveX controls, C++ objects, JavaBeans, Microsoft Foundation Classes ("MFC"), SSE (Streaming SIMD Extension) or other technologies or methodologies, as desired.

Computer system(s) 704 may be configured according to any of the embodiments described herein.

Further modifications and alternative embodiments of various aspects of the invention will be apparent to those skilled in the art in view of this description. For example, systems and methods for setting up a physics-based model are provided. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A system configured to set up a physics-based model, comprising:
   one or more computer subsystems; and
   one or more components executed by the one or more computer subsystems, wherein the one or more components comprise a physics-based model describing a semiconductor fabrication-related process and a set up component, wherein the set up component comprises:
   an objective function configured for comparing results generated by the physics-based model with different values of one or more parameters of the physics-based model to reference data and for generating output responsive to a difference between the results and the reference data;
   a surrogate function configured as an approximation of the objective function and fit to the output generated by the objective function as a function of the different values of the one or more parameters; and
   an acquisition function configured for selecting additional values of the one or more parameters for the physics-based model based on the surrogate function; and
   wherein the set up component is configured for setting up the physics-based model in multiple phases in each of which only a subset of all of the one or more parameters of the physics-based model are set up;
   wherein a configuration of the set up component is changed between at least two of the multiple phases based on the subset of all of the one or more parameters of the physics-based model set up in the at least two of the multiple phases;
   wherein the objective function and the surrogate function used in at least one of the multiple phases are replaced with a different objective function and a different surrogate function, respectively, in a subsequent one of the multiple phases; and
   wherein the acquisition function used in one or more of the at least one of the multiple phases is replaced with a different acquisition function in the subsequent one of the multiple phases, and wherein the different acquisition function samples the surrogate function and the different surrogate function for selecting the additional values.

2. The system of claim 1, wherein the set up component is further configured for performing a Bayesian optimization technique in which the multiple phases are cascaded optimization phases.

3. The system of claim 1, wherein said each of the multiple phases is performed based on output generated by any previously performed of the multiple phases.

4. The system of claim 1, wherein input to the set up component comprises multiple information sources.

5. The system of claim 1, wherein the additional values selected by the acquisition function in a first of the multiple phases are used by the objective function as values of the one or more parameters of the physics-based model in a second of the multiple phases.

6. The system of claim 1, wherein the objective function is constant in two or more of the multiple phases.

7. The system of claim 1, wherein setting up only the subset of all of the one or more parameters of the physics-based model in said each of the multiple phases comprises inputting the selected additional values into the objective function until optimal values for the subset of all of the one or more parameters of the physics-based model are found that maximize the objective function.

8. The system of claim 1, wherein the surrogate function fit in a first of the multiple phases is utilized in a second of the multiple phases.

9. The system of claim 1, wherein the results generated by the physics-based model in a first of the multiple phases are input to the objective function in a second of the multiple phases, and wherein at least one weight for the reference data in the first of the multiple phases and the second of the multiple phases are different.

10. The system of claim 1, wherein the reference data used in the at least one of the multiple phases is replaced with different reference data in the subsequent one of the multiple phases.

11. The system of claim 10, wherein the reference data and the different reference data result in different computational complexity for the physics-based model.

12. The system of claim 10, wherein the reference data is a more computationally efficient source for the physics-based model than the different reference data.

13. The system of claim 12, wherein the surrogate function is further configured to provide an upper bound on predicted objective function value for a location of the different values of the one or more parameters in parameter space.

14. The system of claim 1, wherein the objective function is further configured as a machine learning model.

15. The system of claim 1, wherein the surrogate function is further configured as a machine learning model.

16. The system of claim 1, wherein the semiconductor fabrication-related process is a lithography process.

17. The system of claim 1, wherein the semiconductor fabrication-related process is an etch process.

18. A non-transitory computer-readable medium, storing program instructions executable on one or more computer systems for performing a computer-implemented method for setting up a physics-based model, wherein the computer-implemented method comprises:
    comparing results generated by a physics-based model describing a semiconductor fabrication-related process with different values of one or more parameters of the physics-based model to reference data and generating output responsive to a difference between the results and the reference data with an objective function;
    fitting a surrogate function configured as an approximation of the objective function to the output generated by the objective function as a function of the different values of the one or more parameters; and
    selecting additional values of the one or more parameters for the physics-based model based on the surrogate function with an acquisition function, wherein the objective function, the surrogate function, and the acquisition function are included in a set up component, wherein the set up component and the physics-based model are included in one or more components executed by the one or more computer systems; and
    wherein the set up component is configured for setting up the physics-based model in multiple phases in each of which only a subset of all of the one or more parameters of the physics-based model are set up;
    wherein a configuration of the set up component is changed between at least two of the multiple phases based on the subset of all of the one or more parameters of the physics-based model set up in the at least two of the multiple phases;
    wherein the objective function and the surrogate function used in at least one of the multiple phases are replaced with a different objective function and a different surrogate function, respectively, in a subsequent one of the multiple phases; and
    wherein the acquisition function used in one or more of the at least one of the multiple phases is replaced with a different acquisition function in the subsequent one of the multiple phases, and wherein the different acquisition function samples the surrogate function and the different surrogate function for selecting the additional values.

19. A computer-implemented method for setting up a physics-based model, comprising:
    comparing results generated by a physics-based model describing a semiconductor fabrication-related process with different values of one or more parameters of the physics-based model to reference data and generating output responsive to a difference between the results and the reference data with an objective function;
    fitting a surrogate function configured as an approximation of the objective function to the output generated by the objective function as a function of the different values of the one or more parameters; and
    selecting additional values of the one or more parameters for the physics-based model based on the surrogate function with an acquisition function, wherein the objective function, the surrogate function, and the acquisition function are included in a set up component, wherein the set up component and the physics-based model are included in one or more components executed by one or more computer systems; and
    wherein the set up component is configured for setting up the physics-based model in multiple phases in each of which only a subset of all of the one or more parameters of the physics-based model are set up;
    wherein a configuration of the set up component is changed between at least two of the multiple phases based on the subset of all of the one or more parameters of the physics-based model set up in the at least two of the multiple phases;
    wherein the objective function and the surrogate function used in at least one of the multiple phases are replaced with a different objective function and a different surrogate function, respectively, in a subsequent one of the multiple phases; and
    wherein the acquisition function used in one or more of the at least one of the multiple phases is replaced with a different acquisition function in the subsequent one of the multiple phases, and wherein the different acquisition function samples the surrogate function and the different surrogate function for selecting the additional values.

* * * * *